United States Patent [19]
Gilbert et al.

[11] Patent Number: 5,454,866
[45] Date of Patent: Oct. 3, 1995

[54] GROUT COMPOSITION

[75] Inventors: Gregory M. Gilbert, Johannesburg; Mark Howell, Westonaria; Terrence M. McConnachie, Jan Celliers Park; Paul S. Kirsten, Akasia, all of South Africa

[73] Assignee: H L & H Timber Products (Pty) Ltd., Johannesburg, South Africa

[21] Appl. No.: 385,196

[22] Filed: Feb. 7, 1995

Related U.S. Application Data

[63] Continuation of Ser. No. 81,679, Jun. 23, 1993, abandoned.

[30] Foreign Application Priority Data

| Jun. 23, 1992 | [ZA] | South Africa | 92/4597 |
| Aug. 12, 1992 | [ZA] | South Africa | 92/6055 |
| Mar. 15, 1993 | [ZA] | South Africa | 93/1823 |
| May 4, 1993 | [ZA] | South Africa | 93/3126 |
| Jun. 4, 1993 | [ZA] | South Africa | 93/3934 |

[51] Int. Cl.⁶ ........................................ C04B 7/32
[52] U.S. Cl. ........................ 106/695; 106/735; 106/775; 405/288; 405/289
[58] Field of Search ............................ 106/695, 735, 106/775; 405/288, 289

[56] References Cited

U.S. PATENT DOCUMENTS

| 3,861,929 | 1/1975 | Deets et al. | 106/695 |
| 4,012,264 | 3/1977 | Murray et al. | 106/695 |
| 4,045,237 | 8/1977 | Gaines et al. | 106/695 |
| 4,157,263 | 6/1979 | Gaines et al. | 106/695 |
| 4,195,111 | 3/1980 | Rautenbach | 405/289 |
| 4,357,166 | 11/1982 | Babcock | 106/695 |
| 4,357,167 | 11/1982 | Kellet et al. | 106/695 |
| 4,366,209 | 12/1982 | Babcock | 106/695 |
| 4,773,792 | 9/1988 | Landers | 405/288 |
| 4,983,077 | 1/1991 | Sorge et al. | 405/288 |
| 5,149,228 | 9/1992 | Pienaar et al. | 506/289 |
| 5,288,178 | 2/1994 | Peinaar | 405/288 |

*Primary Examiner*—Anthony Green
*Attorney, Agent, or Firm*—Morgan & Finnegan

[57] ABSTRACT

This invention relates to a grout composition comprising a Portland cement, a high alumina cement, anhydrous calcium sulphate, an effective amount of a lithium salt and an effective amount of a strong base. According to another aspect of the invention, instead of using a strong base directly in the grout composition, a first compound and a second compound is added to the grout composition which in use react to form an effective amount of a strong base when the grout composition is mixed with water.

26 Claims, 7 Drawing Sheets

GROUT COMPOSITION

This is a continuation of application Ser. No. 08/081,679, filed on Jun. 23, 1993, abandoned.

BACKGROUND OF THE INVENTION

THIS invention relates to a grout composition.

Matpacks are used underground in mines to provide support for a hanging wall above a footwall. Generally, the upper surface of the matpack is rarely perfectly flat and the hanging wall is usually extremely rough. To ensure that the load imposed by the hanging wall is evenly distributed over the upper surface of the matpack, it is known to provide a flat, flexible bag which is interposed between the matpack and the hanging wall. The bag is pumped up to a substantial pressure with a settable material. Prior to setting of the contents, the flexibility of the bag enables it to take up the shape of the matpack and of the hanging wall such that, when the contents of the bag set, it is in a condition ready to accept the load imposed thereon by the hanging wall and to distribute that load evenly to the underlying matpack. Matpacks are commonly used but an elongate prop having a headboard at an operatively upper end thereof may also be used. These flexible bags are commonly called pack setting bags or prop setting bags and for the purposes of this specification they will be referred to as pack setting bags.

The grout composition which is used in these pack setting bags should fulfill certain functional requirements to be of use in underground mines. As a guide, the grout composition should attain slab compressive strengths of 0.5 MPa after two hours, 2.5 MPa after twenty four hours and 3.5 MPa after three days. The reason for the two hour functional requirement is that subsequent blasting operations usually take place around the area of the matpack and pack setting bag after about two hours and the grout composition in the pack setting bag should be able to withstand any deformation caused by such subsequent blasting operations. Therefore, the grout composition needs to set relatively rapidly. On the other hand, a grout composition which flash sets is not desirable. The reason for this is that the grout composition when mixed with water is typically in the form of a slurry which is pumped into the pack setting bags. This pumping operation of the wet grout composition would not be possible if the dry grout composition flash sets after mixing it with water.

Conventional grout compositions are comprised essentially of high alumina cement. One of the disadvantages with such compositions is that high alumina cement is generally an expensive cement relative to other types of cement. Further, conventional grout compositions do not always give the desired setting characteristics required in practice.

The present invention seeks to provide an alternative grout composition which may for example be used in pack setting bags.

SUMMARY OF THE INVENTION

According to the invention there is provided a grout composition comprising a Portland cement, a high alumina cement, anhydrous calcium sulphate, an effective amount of a lithium salt and an effective amount of a strong base.

Preferably, the Portland cement is ordinary Portland cement. More preferably, the Portland cement is rapid hardening Portland cement.

Preferably, the anhydrous calcium sulphate is $\alpha$-anhydrite or $\beta$-anhydrite or a mixture thereof.

Preferably, the lithium salt is lithium carbonate or lithium hydroxide.

Preferably, the strong base is sodium hydroxide, potassium hydroxide or sodium aluminate. More preferably, the strong base is sodium hydroxide.

Preferably, the Portland cement comprises between 20 and 80 percent by weight of the total grout composition. More preferably, the Portland cement comprises between 30 and 55% by weight of the total grout composition. In a preferred embodiment of the invention, the Portland cement comprises approximately 45% by weight of the total grout composition.

Preferably, the high alumina cement comprises between 17 and 35% by weight of the total grout composition. More preferably, the high alumina cement comprises between 20 and 28% by weight of the total grout composition. In a preferred embodiment of the invention, the high alumina cement comprises approximately 25% by weight of the total grout composition.

Preferably, the anhydrous calcium sulphate comprises between 20 and 40% by weight of the total grout composition. More preferably, the anhydrous calcium sulphate comprises between 25 and 32% by weight of the total grout composition. In a preferred embodiment of the invention, the anhydrous calcium sulphate comprises approximately 28% by weight of the total grout composition.

An "effective amount" of the lithium salt is an amount which provides an accelerating effect on the setting of the high alumina cement in the grout composition. Such an amount will vary depending on the amount of high alumina cement in the grout composition and the type of lithium salt used. Preferably, the lithium salt comprises between 0.05 and 1% by weight of the high alumina cement. More preferably, the lithium salt comprises between 0.07 and 0.7% by weight of the high alumina cement.

An "effective amount" of a strong base is an amount which provides an accelerating effect on the setting of the Portland cement in the grout composition. Such an amount will vary depending on the amount and type of Portland cement in the grout composition and the type of strong base used. Preferably, the strong base comprises between 0.3 and 3% by weight of the Portland cement in the grout composition. More preferably, the strong base comprises between 0.5 and 1.5% by weight of Portland cement in the grout composition.

According to another aspect of the invention there is provided a grout composition as described above and further comprising an effective amount of a retarding agent.

Preferably, the retarding agent is a lignosulphonate or a salt thereof. The salt of the lignosulphonate may be sodium, calcium, magnesium or ferrochrome lignosulphonate.

Typically, the retarding agent will be in an amount of from between 0.006% and 1.7% by weight of the total grout composition. Preferably, the retarding agent will be in an amount of from between 0.5% and 0.8% by weight of the total grout composition.

It may be desirable to replace the strong base in the grout composition with two compounds which react in use to form a strong base when the grout composition is mixed with water. This may be desirable for example for ease of manufacturing the grout composition. Thus, according to a further aspect of the invention there is provided a grout composition comprising a Portland cement, a high alumina cement, anhydrous calcium sulphate, an effective amount of a lithium salt, and a first compound and a second compound, the first and second compounds in use reacting to form an effective amount of a strong base when the grout composition is mixed with water.

The first compound may be selected from the group comprising a carbonate salt of an alkali metal compound, a carbonate salt of an alkali earth metal compound, a nitrate salt of an alkali metal compound and a nitrate salt of an alkali earth metal compound or a combination thereof, and the second compound may be selected from the group comprising calcium oxide and calcium hydroxide or a combination thereof.

Typically, the first compound is selected from the group comprising:

$Li_2CO_3$, $Na_2CO_3$, $K_2CO_3$, $LiHCO_3$, $NaHCO_3$, $KHCO_3$, $NaNO_3$, $KNO_3$, $LiNO_3$, $Ca(NO_3)_2$ or a combination thereof.

Preferably, the first compound is sodium carbonate and the second compound is calcium hydroxide which in use react to form sodium hydroxide when the grout composition is mixed with water.

According to another aspect of the invention there is provided a wet grout composition comprising a grout composition as described above and water. The weight ratio of water to grout composition may be between 0.5:1 and 4.0:1, and preferably between 2:1 and 3:1.

According to a further aspect of the invention there is provided a grout composition as described above for use in a pack setting bag.

According to a further aspect of the invention there is provided a pack setting bag having a grout composition as described above located therein.

According to a further aspect of the invention there is provided a method of supporting a hanging wall above a footwall in a mine, typically an underground mine, including the steps of:

(a) providing a support on the footwall;

(b) providing a pack setting bag between the support and the hanging wall;

(C) locating a wet grout composition as described above inside the pack setting bag; and (d) allowing the wet grout composition to set.

Typically, the support is a matpack or an elongate prop having a headboard for locating the pack setting bag thereon at an operatively upper end thereof.

DESCRIPTION OF THE DRAWINGS

The invention will now be described in more detail, by way of example only, with reference to the accompanying drawings in which.

DETAILED DESCRIPTION OF THE INVENTION

Figure 1:
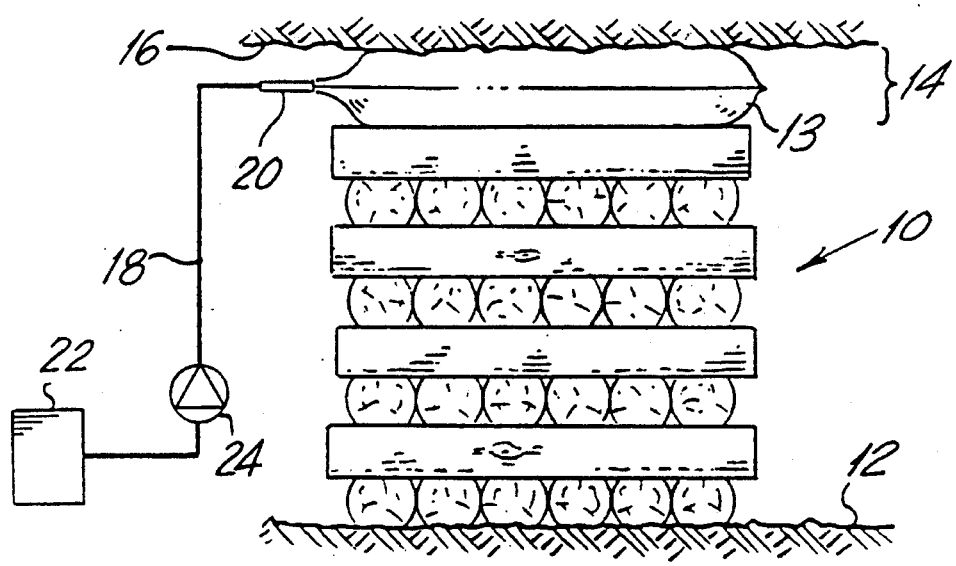
FIG. 1 shows how a pack setting bag is used in practice.

FIG. 1 shows how a pack setting bag is used in practice. A matpack 10 is constructed on the footwall 12 in a mine working and a gap 14 is left between the upper surface of the matpack 10 and the hanging wall 16. The pack setting bag 13 is laid flat on the upper surface of the matpack 10 and a filler line 18 is connected up to a nozzle 20 on the pack setting bag 13. The dry grout composition is located in the mixer 22 and water is added thereto and mixed. The wet grout composition is then pumped up the filler line 18 by means of a pump 24. The pack setting bag 13 is of a flexible construction, and takes up the shape of the upper surface of the matpack 10 and the surface of hanging wall 16. When the wet grout composition sets, the pack setting bag accepts the load imposed thereon by the hanging wall and distributes that load evenly to the underlying matpack 10.

The grout composition which is used in pack setting bags should fulfill certain functional requirements to be of use in underground mines. As a guide, the grout composition should attain slab compressive strengths of 0.5 MPa after two hours, 2.5 MPa after twenty four hours and 3.5 MPa after three days. The reason for the two hour functional requirement is that subsequent blasting operations usually take place around the area of the matpack and pack setting bag after about two hours and the grout composition in the pack setting bag should be able to withstand any deformation caused by such subsequent blasting operations.

It can be seen that the grout composition should not flash set when water is added thereto otherwise the wet grout composition would set in the mixer 22 and consequently would not be able to be pumped up the filler line 18.

A further important functional requirement of the grout composition is that it should be capable of being mixed with a relatively large volume of water while still being able to fulfill the compressive strength functional requirements set out above. Related to this is the functional requirement that no "bleeding" of the grout composition after it has been mixed with water should occur. "Bleeding" refers to the situation when a cement mix is not able to hydrate all the water that it is mixed with, resulting in a layer of water forming on top of the cement when left to set. Typically, grout compositions for pack setting bags are mixed with water at a water to solids ratio of 2:1 or greater. Due to the enormous numbers of pack setting bags that are used in underground mines, operating below a water to solids ratio of 2:1 would simply not be economically viable. Further, low water to solids ratios result in difficulties relating to the pumping operation of the wet grout composition.

The grout composition of the present invention comprises five essential ingredients, namely a Portland cement, a high alumina cement, anhydrous calcium sulphate, a lithium salt and a strong base. Cement mixes incorporating Portland cement, high alumina cement and calcium sulphate compounds, such as gypsum, are well known. Such cement mixes have not been used in the application of pack setting bags since it has been thought in the past that a cement mix which comprises a significant portion of Portland cement would not provide sufficient compressive strength and the setting characteristics required for pack setting bags as outlined in the functional requirements set out above. Therefore, in the past, the cement mixes that have been used in pack setting bags are comprised essentially of high alumina cement which is able to provide the compressive strength required in pack setting bags together with various accelerators such as fluoride salts to provide sufficiently rapid setting characteristics for the high alumina cement.

The present invention is based on the realisation that the addition of two essential ingredients, namely a lithium salt and a strong base, to Portland cement, a high alumina cement and anhydrous calcium sulphate provides a grout composition that is capable of developing sufficient compressive strength and ideal setting characteristics which address the functional requirements set out above for pack setting bags. Furthermore, the grout composition can comprise a significant proportion of Portland cement without effecting the performance of the grout composition.

Portland cement is made up of four main components: tricalcium silicate ($3CaO.SiO_2$), dicalcium silicate ($2CaO.SiO_2$), tricalcium aluminate ($3CaO.Al_2O_3$), and a tetracalcium aluminoferrite ($4CaO.Al_2O_3Fe_2O_3$). There are various types of Portland cement such as ordinary Portland cement and rapid hardening Portland cement all of which are well understood in the art. Generally, rapid hardening Portland cement differs from ordinary Portland cement in that it is more finely ground. Typically, ordinary Portland cement has a Blaine specific surface area of less than 3000 sq.cm./g whereas rapid hardening Portland cement has a Blaine specific area greater than 3000 sq.cm./g.

High alumina cement is a type of cement which is also well understood in the art. The principle cementing compound in high alumina cement is calcium aluminate ($CaO.Al_2O_3$).

Gypsum ($CaSO_4.2H_2O$) is a natural hydrated calcium sulphate. Calcined gypsum includes those forms of the gypsum which have been heated at atmospheric pressure to dry off at least a portion of the water of hydration and contain an average of between a half and zero molecules of water per molecule of calcium sulphate. Generally, normal calcined gypsum (also known in the art as β-gypsum) is substantially composed of $CaSO_4.½H_2O$ and anhydrous calcium sulphate. Hydrated calcium sulphate compounds are not suitable for use in the grout composition of the invention. It has been found that when hydrated forms of calcium sulphate are mixed with the other components of the grout composition of the invention and water, "bleeding" of the wet grout composition occurs. No "bleeding" can occur when a grout composition is used in the application of pack setting bags since the functional requirements cannot be met if a layer of water forms towards the top of the bag. Only anhydrous calcium sulphate can be used in the grout composition of the invention. α-Anhydrite and β-anhydrite are two crystalline types of anhydrous calcium sulphate and either of these types, or a mixture of both, can be used. Small quantities of the hemi-hydrate or the dihydrate forms of calcium sulphate can of course be tolerated provided that the calcium sulphate that is used is substantially anhydrous calcium sulphate.

The grout composition of the present invention comprises five essential ingredients in combination. As stated above, the grout composition of the invention surprisingly attains the functional requirements of a grout composition which is capable of being used in the application of pack setting bags. If any one of the five essential ingredients is omitted, then the grout composition will not perform accordingly.

There are prior art cementitious mixes disclosing a mixture of three of the essential ingredients, namely Portland cement, calcium, sulphate and high alumina cement. One prior art patent application discloses even four of the essential ingredients in combination: Japanese Patent Application No. 61-191552 in the name of Nippon Oils Limited describes a cementitious mix comprising Portland cement, alumina cement, calcium sulphate, lithium carbonate, a weak base, namely potassium carbonate and a retarder, namely sodium citrate.

The cementitious compositions described in the Japanese patent application were compared to a grout composition of the present invention. The Japanese patent application sets out examples of seven cementitious compositions. The compositions of the seven examples are set out in TABLE 1.

TABLE 1

|  | 1 | 2 | 3 | 4 | 5 | 6 | 7 |
|---|---|---|---|---|---|---|---|
| Rapid Hardening Portland Cement | 3,67 kg | 3,0 kg | 1,75 kg | 1,75 kg | 2,75 kg | 2,0 kg | 2,0 kg |
| High Alumina Cement | 1,04 kg | 1,5 kg | 2,0 kg | 2,25 kg | 1,75 kg | 2,0 kg | 1,75 kg |
| Anhydrous Calcium Sulfate | 250 g | 500 g | 1,25 kg | 1,0 kg | 0,5 kg | 1,0 kg | 1,25 kg |
| Lithium Carbonate | 50 g | 25 g | 25 g | 1,5 g | 2,5 kg | 2,5 g | 2,5 g |
| Potassium Carbonate | 150 g | 25 g | 25 g | 50 g | 100 kg | 75 g | 75 g |
| Sodium Citrate | 250 g | 25 g | 100 g | 50 g | 5 g | 30 g | 50 g |

Figure 2:
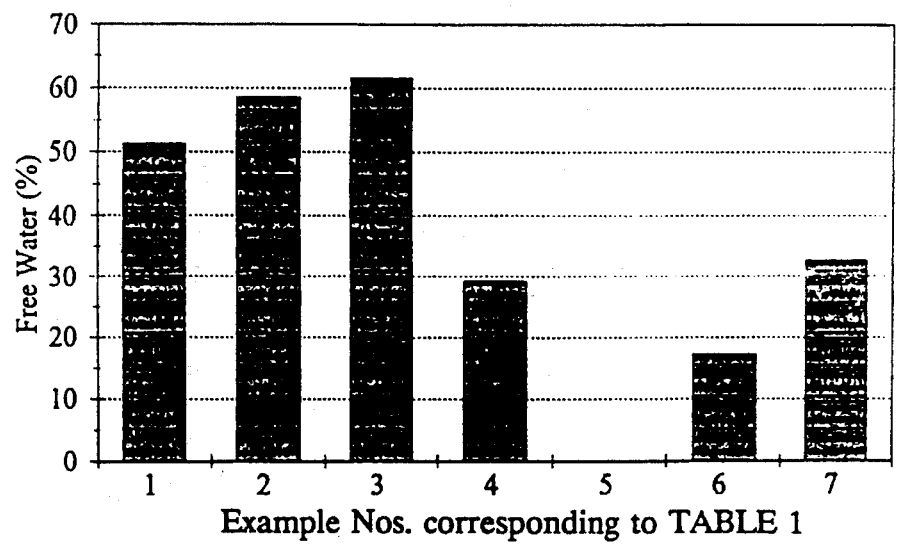
FIG. 2 shows the percentage free water remaining after wet cementitious mixes were made in accordance with the prior art.

Dry cement mixes of these compositions were made. Water was added to the dry mixes at a water to solids ratio of 2.5:1 and mixed thoroughly. The compositions were then left to set. Excessive "bleeding" occurred in six out of the seven examples. FIG. 2 shows the amounts of bleeding that occurred in each of the examples. Up to as much as 60% of free water was found in some of the examples. Thus, six out of seven of the example cement compositions of this Japanese patent application would not be capable of being used in the application of pack setting bags. Only in the cement composition of example 5 was no bleeding apparent.

Cementitious mixes made in accordance with example 5 were then subjected to compressive strength tests. The cementitious mixes were again mixed with water at a water to solids ratio of 2.5:1 before being allowed to set. The results are set out in table 2. It can be seen that a compressive strength of not even 1 MPa was reached after 168 hours. Thus, such a cementitious mix could not be used in the application of pack setting bags as it does not come close to fulfilling the functional requirements of the grout composition used in pack setting bags.

After extensive test work, a grout composition according to the invention which was found to show particularly good compressive strength had the following mix.

i. 2.23 kg of rapid hardening Portland cement;

ii. 1.24 kg of high alumina cement;

iii. 1.49 kg of anhydrous calcium sulphate;

iv. 2 grams lithium carbonate; and v. 30 grams sodium hydroxide (in dry pellet form).

Alternatively stated, the grout composition comprised 45% rapid hardening Portland cement, 25% high alumina cement, 30% anhydrous calcium sulphate, 0.16% lithium carbonate (based on weight high alumina cement) and 1.35% sodium hydroxide (based on weight rapid hardening Portland cement).

This grout composition shall hereinafter be referred to as the "standard mix".

Figure 3:
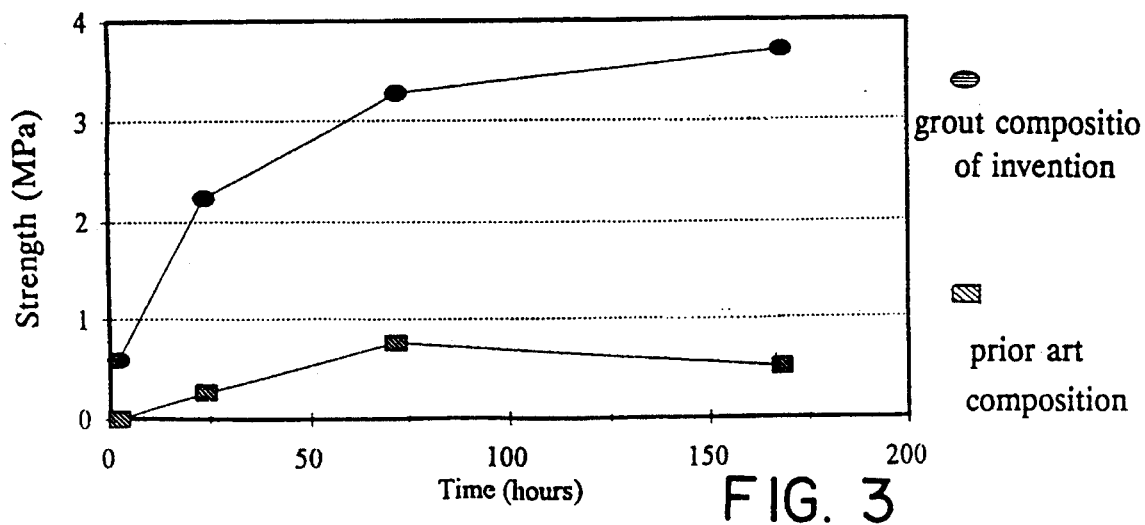
FIG. 3 shows comparative compressive strengths of a grout composition made in accordance with the invention and a prior art composition.

Grout compositions made in accordance with the standard mix composition were then mixed with water at a water to solids ratio of 2.5:1, allowed to set and then subjected to the same compressive strength tests as that of the compositions made in accordance with example 5 of the Japanese patent application. FIG. 3 illustrates the comparative compressive strengths of the standard mix composition of the invention against the cementitious mix of the example 5 composition of the prior art. It can be seen that the grout compositions of the invention attain far higher compressive strengths than the prior art composition.

In order to establish the effective ranges in which each of the essential ingredients may be provided, compressive strength tests were conducted on various grout compositions wherein the amount of one ingredient of the standard mix was varied while the amounts of the other ingredients were kept constant.

Each composition tested was mixed with water at a 2.5:1 water to solids ratio.

Each composition tested was mixed with water and allowed to set in the shape of a cube measuring 100 mm×100 mm×100 mm. The cube was then subjected to a compression test and compressed until failure of the cube. It is important to note that the functional requirements as set out previously in this specification relate to compressive strengths of a slab of material measuring 600 mm×600 mm×60 mm. A cube of material measuring 100 mm×100 mm×100 mm is more easily crushed than a slab of material measuring 600 mm×600 mm×60 mm. It has been determined that such a slab has approximately 1.6 times the compressive strength of such a cube when made of the same material. Consequently, for the purposes of the following tests, a grout composition in the form of a cube having a compressive strength of above 0.3 MPa measured after two hours will satisfy the previously set out functional requirement of a grout composition in the form of a slab having a compressive strength of 0.5 MPa after two hours.

(A) Strong base:

Various grout compositions were made in accordance with the standard mix except that the amounts of strong base were varied between 5 grams and 40 grams.

The compressive strength of each cube of grout composition made was measured two hours after mixing.

Figure 4:
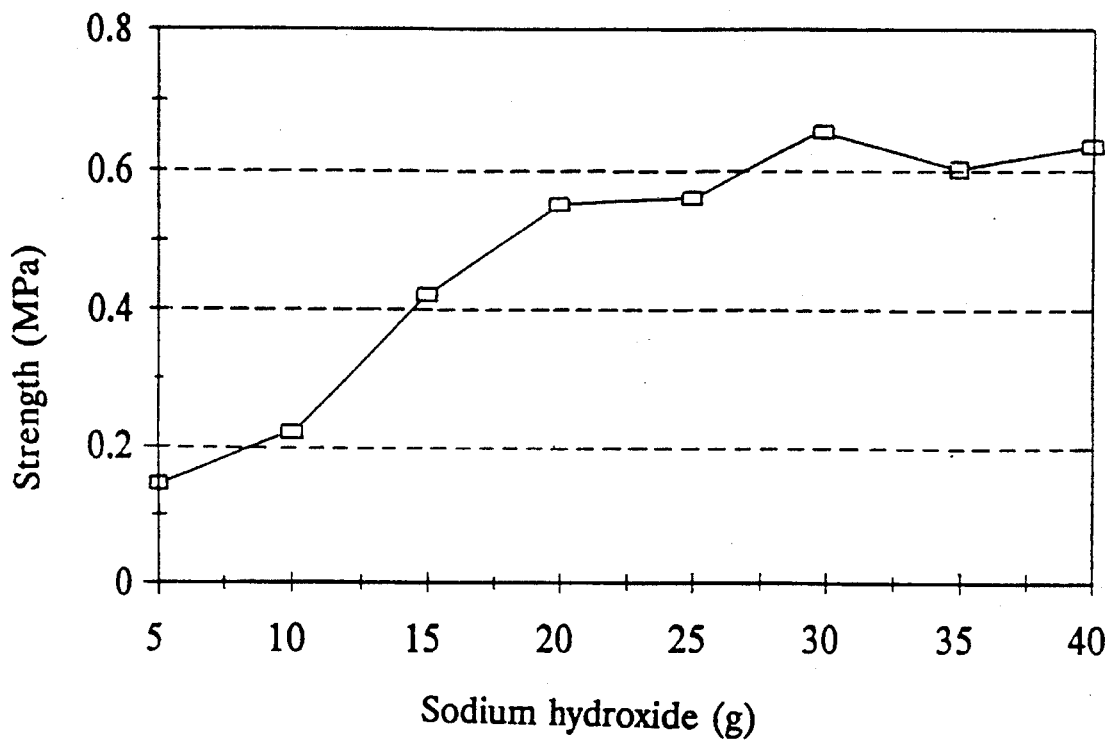
FIG. 4 shows the compressive strengths of various grout compositions made in accordance with the invention.

The results for sodium hydroxide are shown in FIG. 4. It can be seen that an amount of 12 grams or more provides a cube strength of 0.3 MPa after a two hour period which is sufficient to satisfy the mentioned functional requirement. The standard mix comprises 2.23 kg of rapid hardening Portland cement. If sodium hydroxide is used, an amount of above 0.5% based on the amount of rapid hardening Portland cement should advantageously be used. 12 to 30 grams of sodium hydroxide in the standard mix amounts to a percentage of 0.5 to 1.35% by weight of Portland cement.

Figure 5:
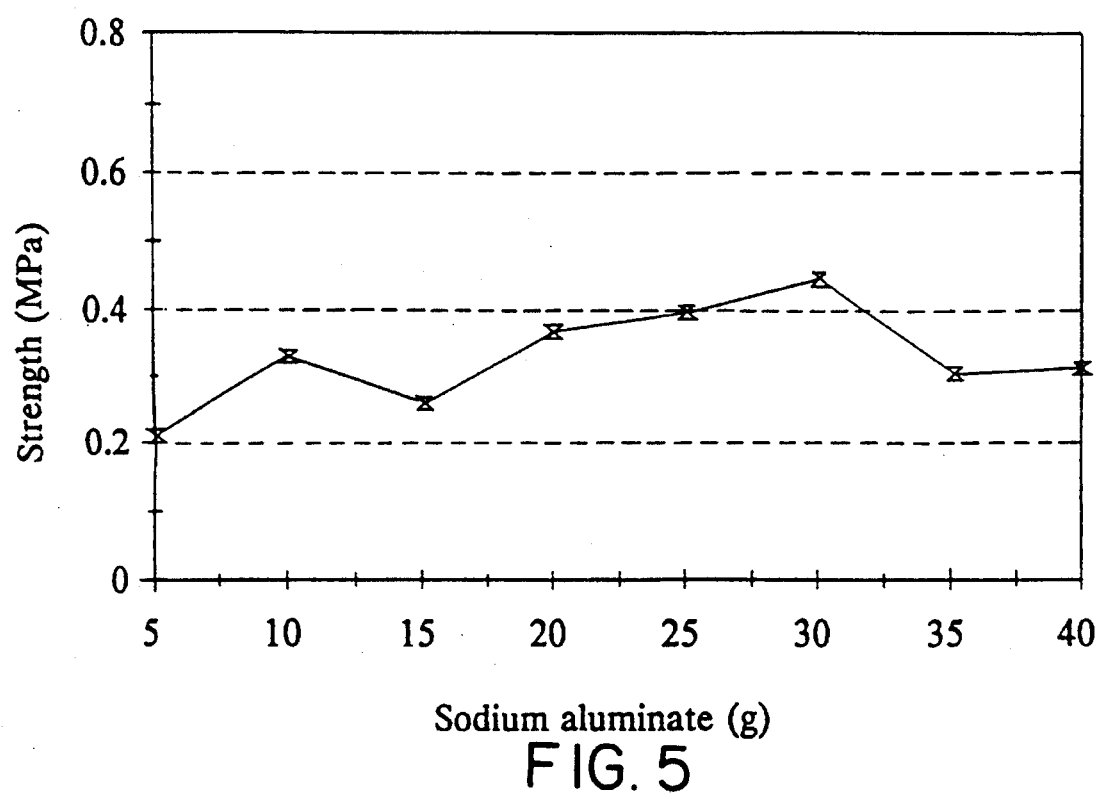
FIG. 5 shows the compressive strengths of various grout compositions made in accordance with the invention.

FIG. 5 illustrates the use of sodium aluminate as the strong base. It can be seen that an amount of between 17 and 35 grams of sodium aluminate is required in the standard mix to provide an advantageous compressive strength. This amounts to between 0.7 and 1.6% sodium aluminate based on the weight of rapid hardening Portland cement.

Figure 6:
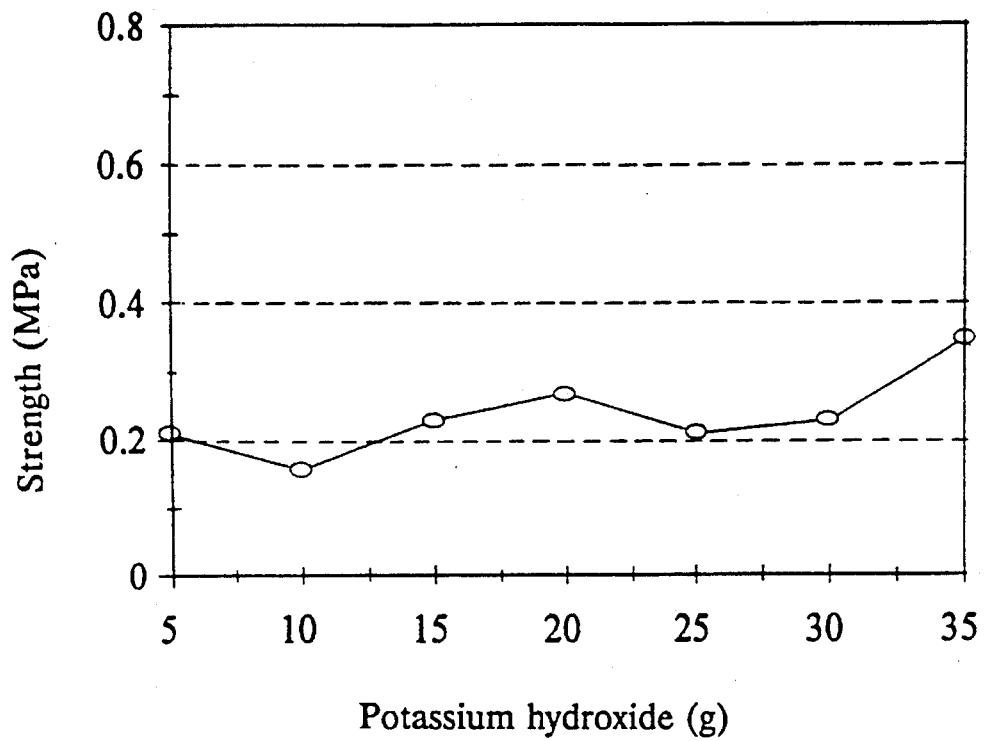
FIG. 6 shows the compressive strengths of various grout compositions made in accordance with the invention.

FIG. 6 illustrates the use of potassium hydroxide as the strong base. It can be seen that an amount of 35 grams of potassium hydroxide in the standard mix will provide sufficient compressive strength after the two hour period. This amounts to an amount of about 1.5% potassium hydroxide based on weight rapid hardening Portland cement.

Figure 7:
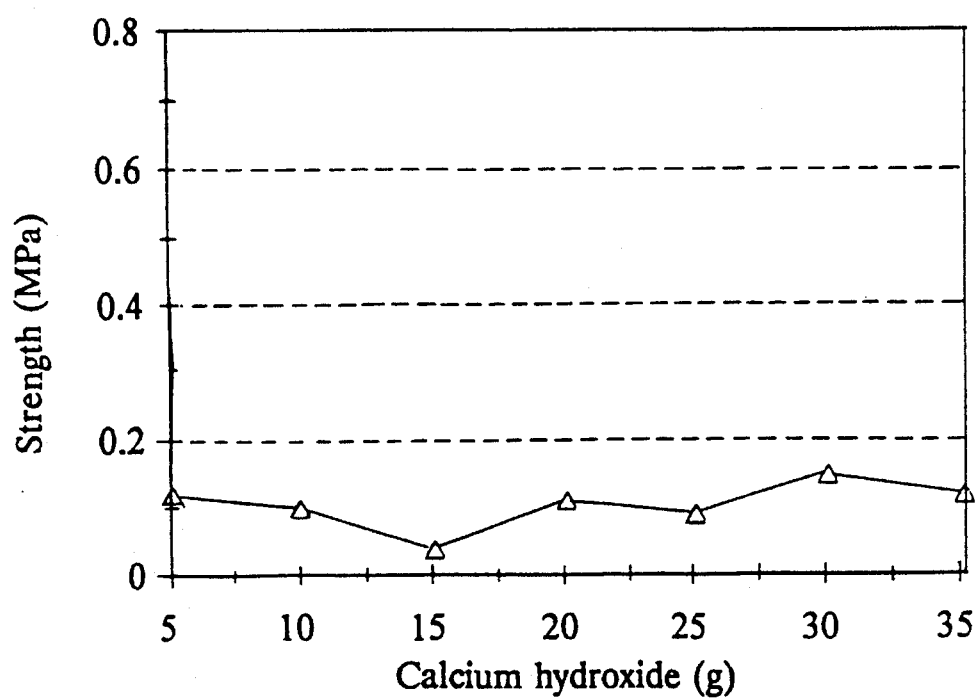
FIG. 7 shows the compressive strengths of various grout compositions not made in accordance with the invention.
Figure 8:
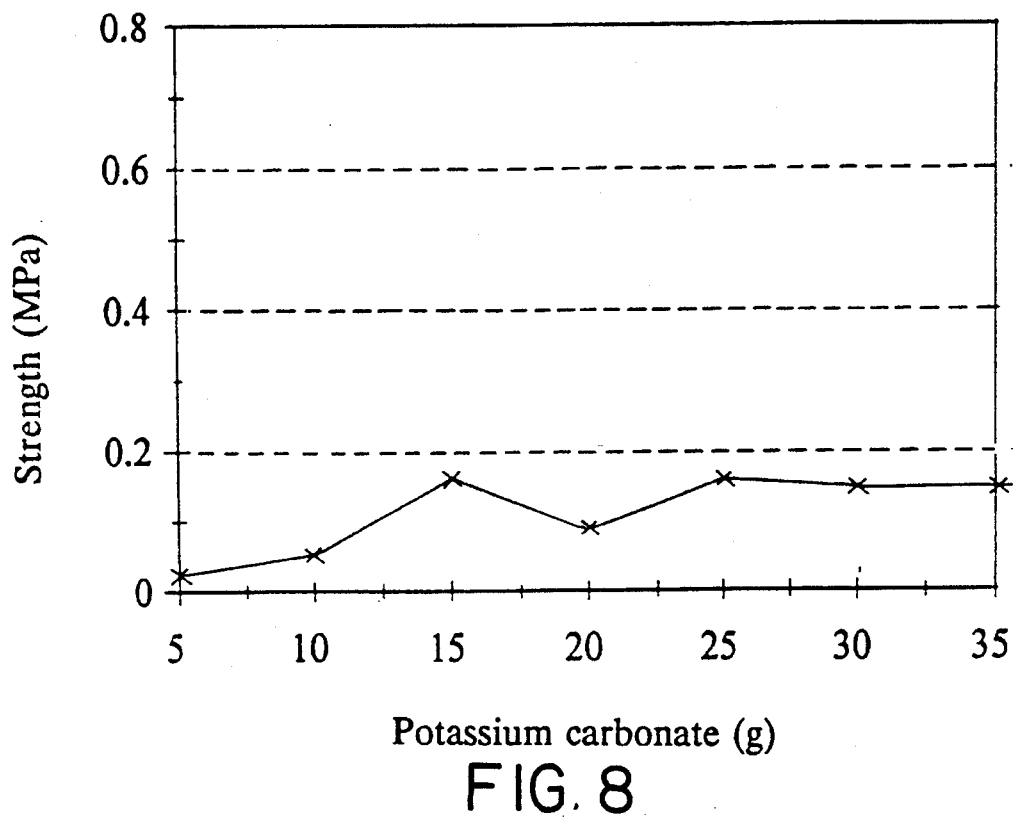
FIG. 8 shows the compressive strengths of various grout compositions not made in accordance with the invention.
Figure 9:
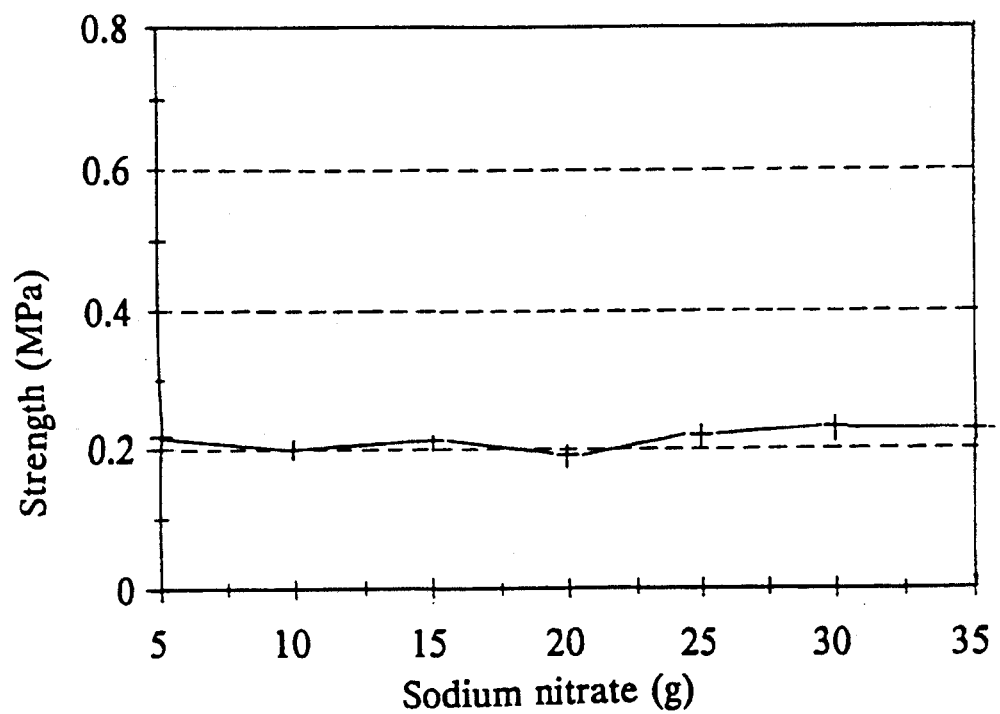
FIG. 9 shows the compressive strengths of various grout compositions not made in accordance with the invention.

FIGS. 7, 8 and 9 illustrate the use of weak bases namely, calcium hydroxide, potassium carbonate and sodium nitrate respectively. It can be seen that none of these bases provide sufficient compressive strength to fulfill the functional requirements of a grout composition used in pack setting bags.

On comparing FIGS. 4, 5 and 6, it can be seen that sodium hydroxide provides outstanding results and is therefore the preferred strong base to be used in accordance with the grout composition of the present invention.

Figure 10:
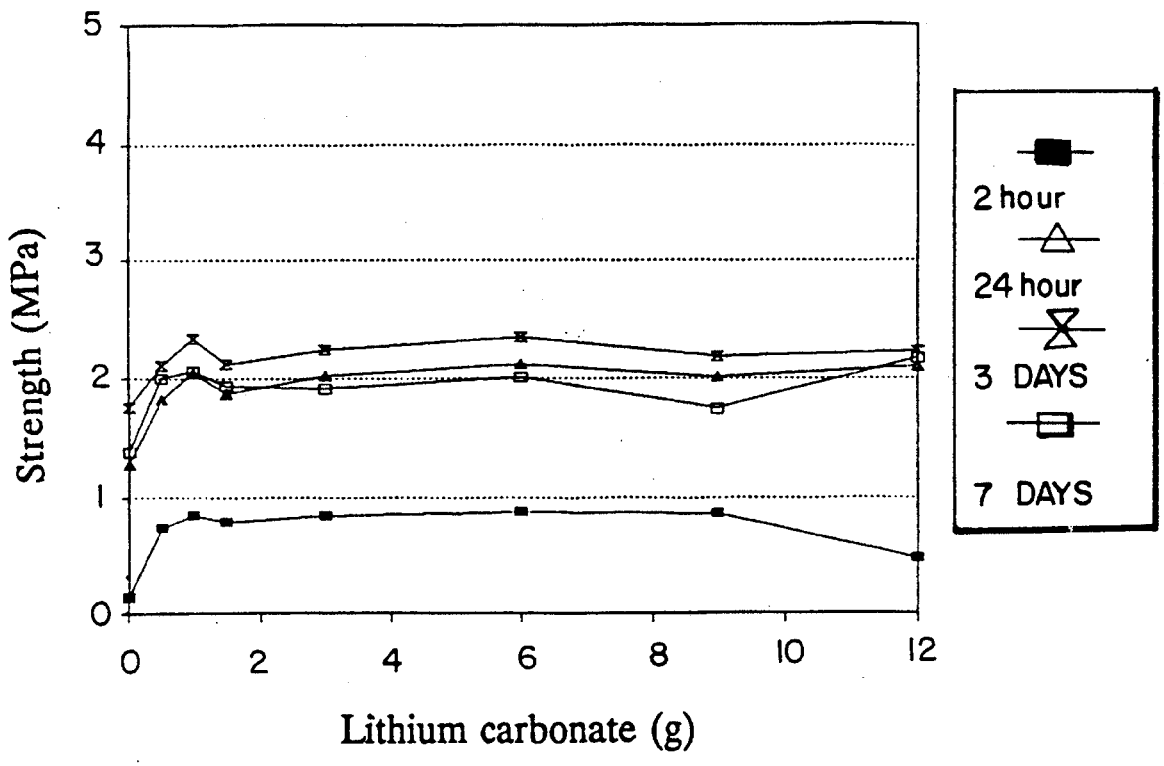
FIG. 10 shows the compressive strengths of various grout compositions made in accordance with the invention.
Figure 11:
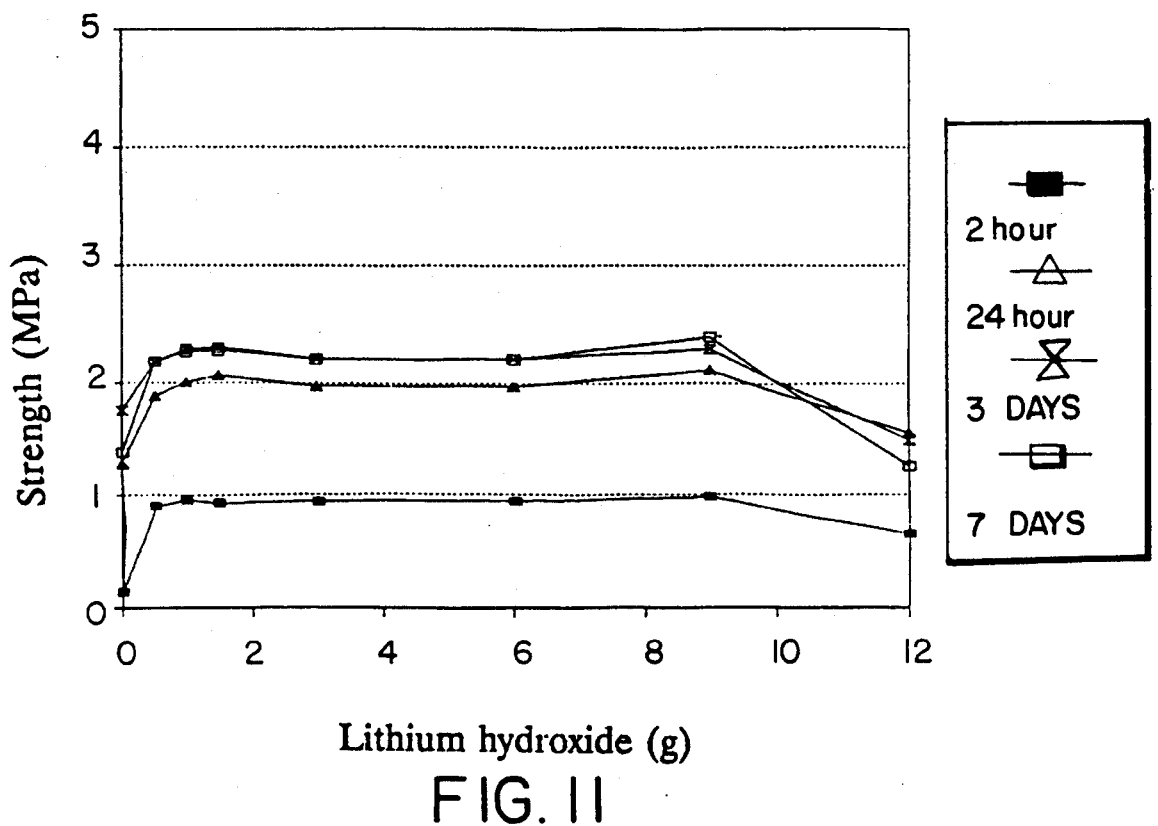
FIG. 11 shows the compressive strengths of various grout compositions made in accordance with the invention.

(B) Lithium salt:

Various grout compositions were made in accordance with the standard mix except that the amounts of various lithium salts were varied between 5 grams and 30 grams in the cement mix. FIGS. 10 and 11 illustrate the use of varying amounts of lithium carbonate and lithium hydroxide respectively over two hour, twenty four hour, three day and seven day setting periods. It can be seen that 1 gram or more of lithium carbonate or lithium hydroxide provides optimum compressive strengths for the grout composition. 1 gram of lithium hydroxide in the standard mix amounts to 0.08% by weight of high alumina cement present in the grout composition. For a setting period of 2 hours, it appears that the compressive strength actually decreases if one adds more than 9 grams of lithium carbonate or lithium hydroxide in the standard mix. 9 grams amounts to about 0.7% by weight of the high alumina cement present in the composition. Thus an effective range of lithium salt as an accelerating agent is between 0.07 and 0.7% by weight of high alumina cement present in the grout composition.

Figure 12:
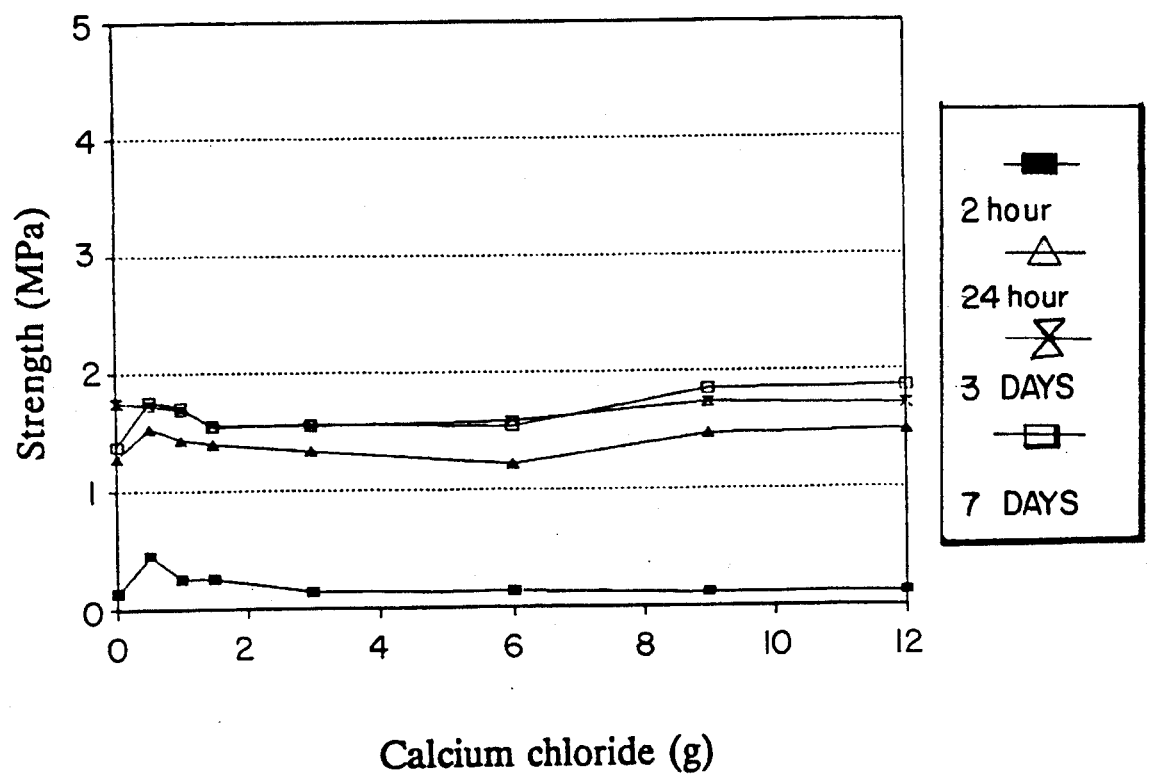
FIG. 12 shows the compressive strengths of various grout compositions not made in accordance with the invention.

FIG. 12 illustrates the use of calcium chloride as an accelerating agent. It can be seen that calcium chloride does not work effectively with the other ingredients of the composition to provide a grout composition of sufficient compressive strength for pack setting bags. In particular, the compressive strength at the two hour setting period is completely insufficient.

Figure 13:
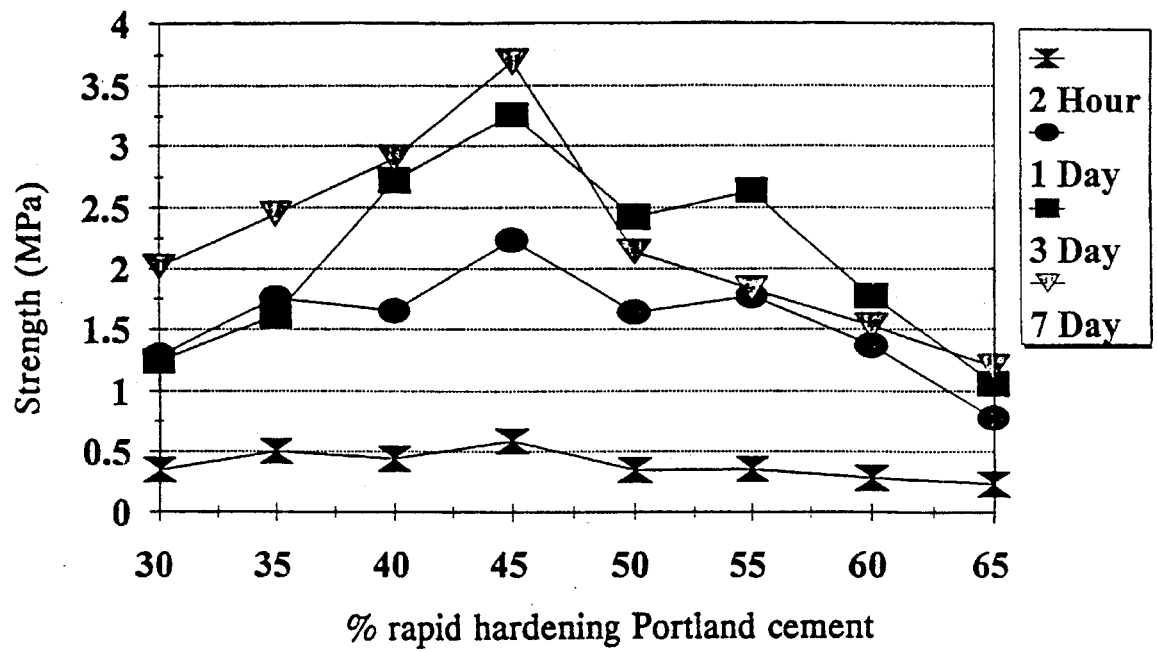
FIG. 13 shows the compressive strengths of various grout compositions made in accordance with the invention.

(c) Rapid hardening Portland cement, high alumina cement and anhydrous calcium sulphate:

Various grout compositions were made in accordance with the standard mix except that the amounts of rapid hardening Portland cement were varied. The compressive strengths of various grout compositions were tested at two hour, one day, three day and seven day setting periods and the percentage of rapid hardening Portland cement was varied between 30% and 65%. The ratio of high alumina cement to anhydrous calcium sulphate was kept constant at 0.83:1. The compressive strength test results are illustrated in FIG. 13. It can be seen that although sufficient compressive strengths were attained across the entire range of compositions, the preferred range was between 30 and 55% rapid hardening Portland cement. A particularly effective grout composition was attained at a 45% rapid hardening Portland cement grout composition.

Figure 14:
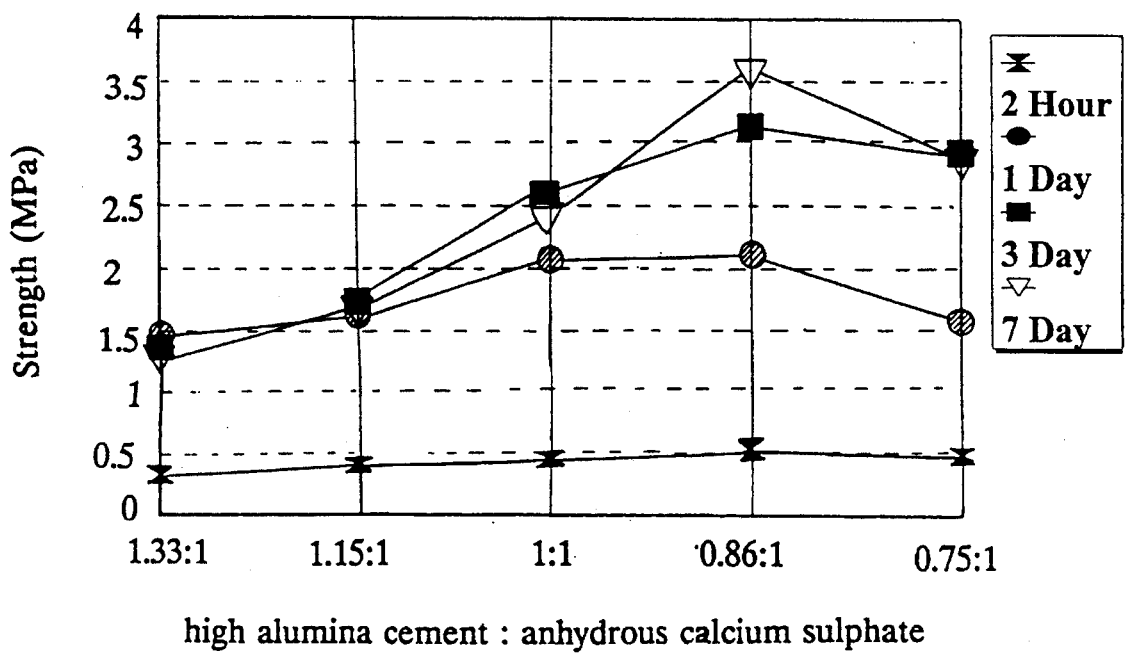
FIG. 14 shows the compressive strengths of various grout compositions made in accordance with the invention.

Various grout compositions were then made whereby the percentage rapid hardening Portland cement was maintained at 45%. The ratio of high alumina cement to anhydrous calcium sulphate was then varied from between 1.33:1 and 0.75:1. The compressive strength test results are illustrated in FIG. 14. Although effective compressive strengths were obtained across the entire range of grout compositions tested, it can be seen that a ratio of high alumina cement to anhydrous calcium sulphate of between 1:1 and 0.75:1 is preferred. Therefore, if the rapid hardening Portland cement comprises 45% of the composition, then a preferred range of the anhydrous calcium sulphate is between 27% and 31% and the preferred range of the high alumina cement is between 23% and 27%.

It will be appreciated that the ranges of the ingredients mentioned above have been established on an experimental scale. In practice, where relatively larger volumes of cement and additives are being mixed together, it may be found that the preferred ranges of each ingredient may differ from those which have been established on an experimental scale.

In practice, the situation may arise that the wet grout composition in the pump line and in the pump itself will set while the pump is not operational. This will cause a blockage in the pump line and in the pump when an attempt is made to operate the pump again. Rapid hardening cement and grout compositions may set to a sufficient strength to cause blockage of a pump line or a pump within twenty minutes of the pump not being operational.

Typically, this does not present a problem since the wet grout composition is pumped on a substantially continuous basis. However, there may be situations in practice which demand that a pump should remain unoperational for a period of up to twenty minutes. In such circumstances, the wet grout composition should not set to a sufficient strength to cause a blockage of the pump or a blockage of the pump line for at least twenty minutes. The time in which it takes a grout composition to set to a sufficient strength to cause a blockage of a pump line or a pump is generally termed the "pump life" of the grout composition. There may be situations where the "pump life" of such a grout composition needs to be extended.

In such a situation an effective amount of a retarding agent may be added. A lignosulphonate or a salt thereof has been found to be a particularly effective retarding agent in the grout compositions of the invention. In particular, sodium lignosulphonate, calcium lignosulphonate, magnesium lignosulphonate or ferrochrome lignosulphonate may be used.

An "effective amount" of a retarding agent is defined for the purposes of this specification to be an amount of a retarding agent which will increase the "pump life" of a grout composition. Typically, the retarding agent will be in an amount of from between 0.006% and 1.7% by weight of the total grout composition. Preferably, the retarding agent will be in an amount of from between 0.5% and 0.8% by weight of the total grout composition.

A grout composition was made up as follows:

high alumina cement 3.75 kg anhydrous calcium sulphate 4.5 kg rapid hardening Portland cement 6.75 kg sodium hydroxide 70 grams lithium carbonate 6 grams.

This grout composition was mixed with 29 liters of water to form a wet composition. This wet grout composition was found to have a "pump life" of approximately 7 minutes.

A grout composition was then made in accordance with the present invention. An identical grout composition was made as described in the previous paragraph but an additional 100 grams (0.66% of the total grout composition) of sodium lignosulphonate was added to the grout composition. The composition was mixed with 29 liters of water to form a wet grout composition. This wet grout composition was found to have a pump life of 25 minutes.

Strong bases, and in particular sodium hydroxide, are unpleasant substances to work with from an operator point of view. They are also extremely corrosive substances. Sodium hydroxide for example is also very hygroscopic and this may lead to problems in the manufacturing of the grout composition. It may be desirable for ease of manufacturing, to replace the direct addition of a strong base with two compounds which are inert with respect to one another in their dry state and which independently are less corrosive than the strong base. These two compounds may be added in dry form to the dry grout composition. When the grout composition is in use mixed with water, the two compounds react with one another to form the strong base. One compound may be selected from the group comprising a carbonate salt of an alkali metal compound, a carbonate salt of an alkali earth metal compound, a nitrate salt of a alkali metal compound and a nitrate salt of an alkali earth metal compound, or a combination thereof, and the other compound may be selected from the group comprising calcium oxide and calcium hydroxide or a combination thereof. For example, the first compound may be selected from the group comprising:

$Li_2CO_3$, $Na_2CO_3$, $K_2CO_3$, $LiHCO_3$, $NaHCO_3$, $KHCO_3$, $NaNO_3$, $KNO_3$, $LiNO_3$, $Ca(NO_3)_2$ or a combination thereof.

Preferably, the first compound is sodium carbonate and the second compound is calcium hydroxide which react to form sodium hydroxide when the grout composition is mixed with water.

An example of such a grout composition is as follows:

high alumina cement—2.5 kg rapid hardening Portland cement—4.5 kg anhydrous calcium sulphate—0.3 kg lithium carbonate—0.002 kg sodium carbonate—0.1 kg calcium hydroxide—0.25 kg Bentonite—0.1 kg.

It will be noted that this grout composition obviates the need of adding directly a strong base to the grout composition. Instead, sodium carbonate and calcium hydroxide compounds are provided. These latter compounds are easy to work with from an operator point of view and are not corrosive compounds. Further, they react to form sodium hydroxide, which is a strong base, in situ when the grout composition is mixed with water. This also has the beneficial effect of extending the "pump life" of the grout composition. The reason why the "pump life" of the grout composition is extended is because the reaction of the calcium hydroxide and sodium carbonate gradually occurs to form sodium hydroxide and it is the sodium hydroxide which accelerates the hardening of the grout composition.

We claim:

1. A grout composition which sets after being mixed with water comprising:

a Portland cement wherein the Portland cement comprises between 20 and 80% by weight of the total grout composition;

a high alumina cement wherein the high alumina cement comprises between 17 and 35% by weight of the total grout composition;

anhydrous calcium sulphate wherein the anhydrous calcium sulphate comprises between 20 and 40% by weight of the total grout composition;

an effective amount of a lithium salt to provide accelerated setting of the high alumina cement; and an effective amount of a strong base to provide accelerated setting of the Portland cement, the strong base selected from the group consisting of sodium hydroxide, potassium hydroxide and sodium aluminate.

2. A group composition which sets after being mixed with water comprising:

a Portland cement wherein the Portland cement comprises between 20 and 80% by weight of the total group composition;

a high alumina cement wherein the high alumina cement comprises between 17 and 35% by weight of the total grout composition;

anhydrous calcium sulphate wherein the anhydrous calcium sulphate comprises between 20 and 40% by weight of the total grout composition;

an effective amount of a lithium salt to provide accelerated setting of the high alumina cement; and a first compound and a second compound which in use react to form an effective amount of a strong base when the grout composition is mixed with water so as to provide accelerated setting of the Portland cement, the formed strong base selected from the group consisting of sodium hydroxide, potassium hydroxide and sodium aluminate.

3. A grout composition according to claim 1 or claim 2 which further comprises an effective amount of a retarding agent to provide a retarding effect on the setting of the grout composition.

4. A grout composition according to claim 1 or claim 2 wherein the Portland cement is ordinary Portland cement.

5. A grout composition according to claim 1 or claim 2 wherein the Portland cement is rapid hardening Portland cement.

6. A grout composition according to claim 1 or claim 2 wherein the anhydrous calcium sulphate is α-anhydrite or β-anhydrite or a mixture thereof.

7. A grout composition according to claim 1 or claim 2 wherein the lithium salt is selected from the group consisting of lithium carbonate and lithium hydroxide.

8. A grout composition according to claim 1 or claim 2 wherein the strong base is sodium hydroxide.

9. A grout composition according to claim 1 or claim 2 wherein the Portland cement comprises between 30 and 55% by weight of the total grout composition.

10. A grout composition according to claim 1 or claim 2 wherein the high alumina cement comprises between 20 and 28% by weight of the total grout composition.

11. A grout composition according to claim 1 or claim 2 wherein the anhydrous calcium sulphate comprises between 25 and 32% by weight of the total grout composition.

12. A grout composition according to claim 1 or claim 2 wherein the lithium salt comprises between 0.05 and 1% by weight of the high alumina cement.

13. A grout composition according to claim 1 or claim 2 wherein the lithium salt comprises between 0.07 and 0.7% by weight of the high alumina cement.

14. A grout composition according to claim 1 or claim 2 wherein the strong base comprises between 0.3 and 3% by weight of the Portland cement.

15. A grout composition according to claim 1 or claim 2 wherein the strong base comprises between 0.5 and 1.5% by weight of the Portland cement.

16. A grout composition according to claim 1 or claim 2 and which further comprises a retarding agent, wherein the retarding agent is selected from the group consisting of a lignosulphonate and a salt of a lignosulphonate.

17. A grout composition according to claim 1 or claim 2 and which further comprises a retarding agent, wherein the retarding agent is selected from the group consisting of sodium lignosulphonate, calcium lignosulphonate, magnesium lignosulphonate and ferrochrome lignosulphonate.

18. A grout composition according to claim 1 or claim 2 and which further comprises a retarding agent to provide a retarding effect on the setting of the grout composition, wherein the retarding agent comprises between 0.006 and 1.7% by weight of the total grout composition.

19. A grout composition according to claim 1 or claim 2 and which further comprises a retarding agent to provide a retarding effect on the setting of the grout composition, wherein the retarding agent comprises between 0.5 and 0.8% by weight of the total grout composition.

20. A grout composition according to claim 2 wherein the first compound is selected from the group comprising a carbonate salt of an alkali metal compound, a carbonate salt of an alkali earth metal compound, a nitrate salt of an alkali metal compound and a nitrate salt of an alkali earth metal compound or a combination thereof, and the second compound is selected from the group comprising calcium oxide and calcium hydroxide or a combination thereof.

21. A grout composition according to claim 2 wherein the first compound is selected from the group consisting of $Li_2CO_3$, $Na_2CO_3$, $K_2CO_3$, $LiHCO_3$, $NaHCO_3$, $KHCO_3$, $NaNO_3$, $KNO_3$, $LiNO_3$, $Ca(NO_3)_2$ or a combination thereof, and the second compound is selected from the group comprising calcium oxide and calcium hydroxide or a combination thereof.

22. A grout composition according to claim 2 wherein the first compound is sodium carbonate and the second compound is calcium hydroxide which in use react to form sodium hydroxide when the grout composition is mixed with water.

23. A wet grout composition comprising:

a grout composition according to claim 1 or claim 2; and water.

24. A wet grout composition comprising:

a grout composition according to claim 1 or claim 2; and water, wherein the weight ratio of water to grout composition is between 0.5:1 and 4.0:1.

25. A pack setting bag having a grout composition according to claim 1 or claim 2 located therein.

26. A method of supporting a hanging wall above a footwall in a mine including the steps of:

(a) providing a support on the footwall;

(b) providing a pack setting bag between the support and the hanging wall;

(c) locating a wet grout composition comprising a mixture of a grout composition according to claim 1 or claim 2 and water, inside the pack setting bag; and (d) allowing the wet grout composition to set.

* * * * *